April 12, 1949.  P. CAHEN ET AL  2,466,761
RESISTANCE WELDING APPARATUS
Filed May 26, 1944  4 Sheets-Sheet 4
Fig. 7
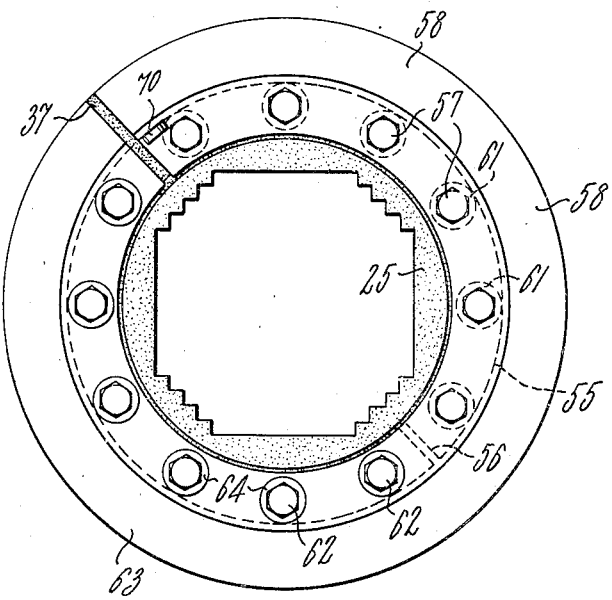
Fig. 8
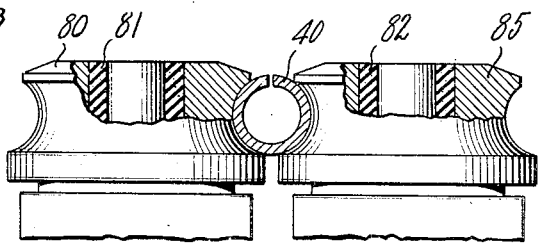
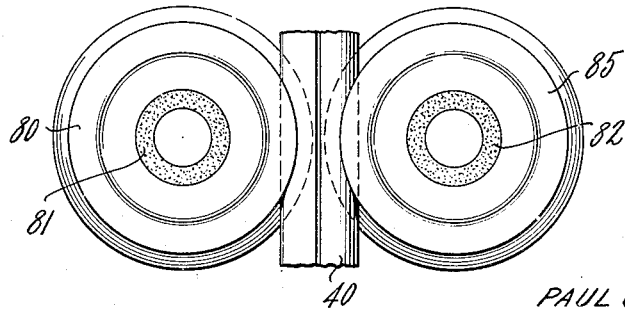
Fig. 9
INVENTORS
PAUL CAHEN &
GUSTAVO A.M. LUTZ
BY
Richard A. Marsen
ATTORNEY Patented Apr. 12, 1949

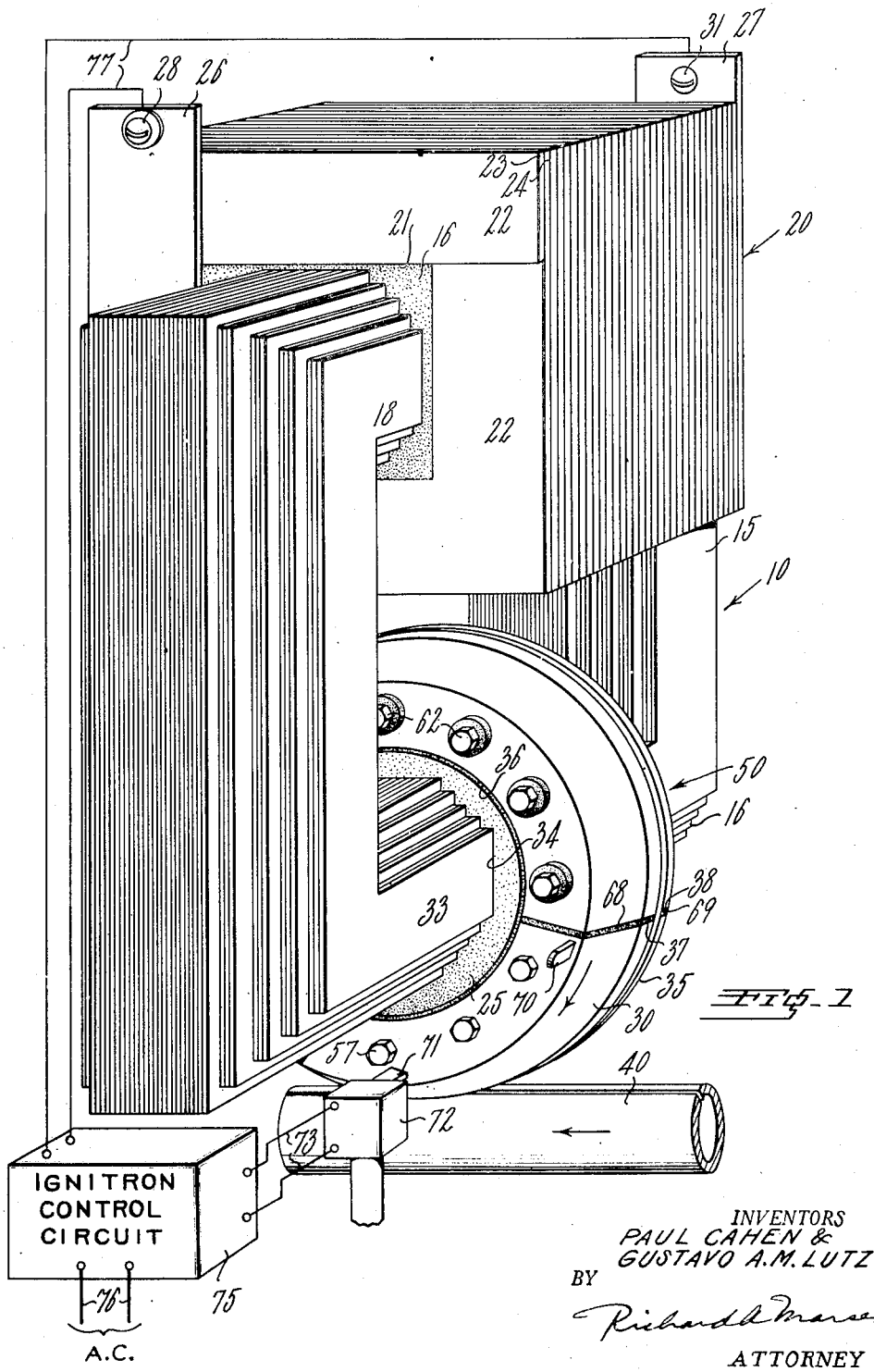

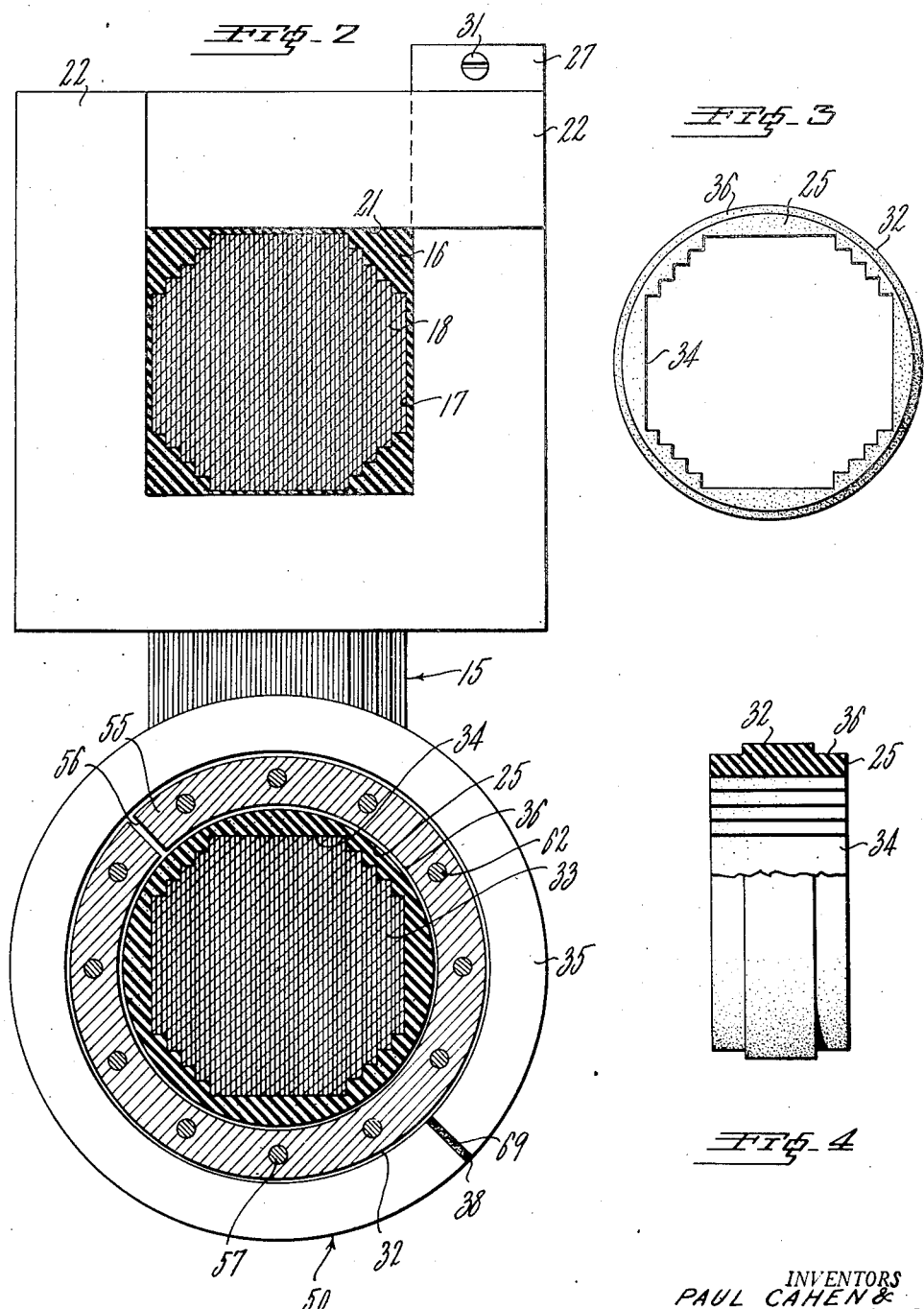

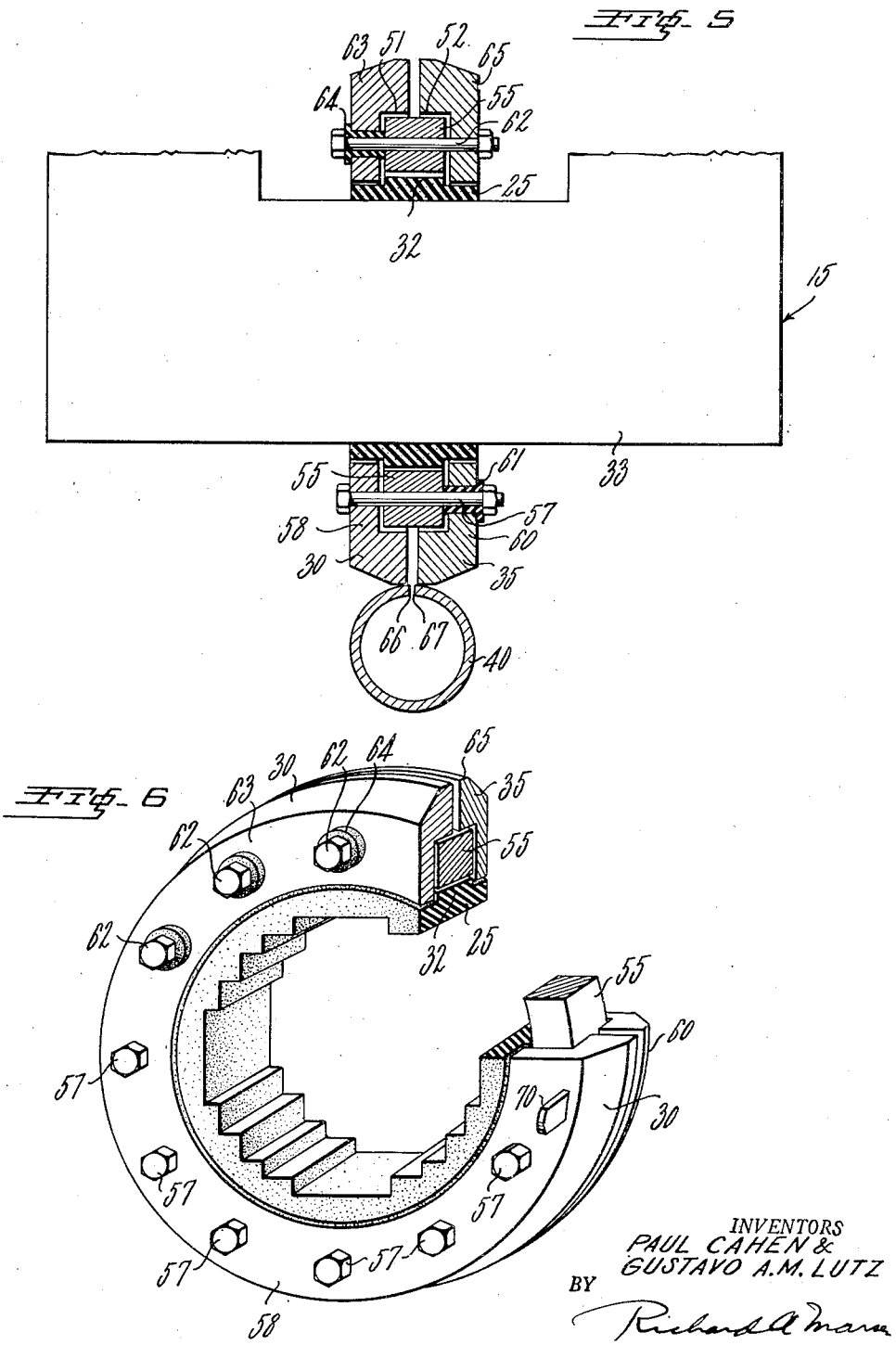

2,466,761

UNITED STATES PATENT OFFICE 2,466,761

RESISTANCE WELDING APPARATUS

Paul Cahen and Gustavo Adolpho Marinho Lutz, Rio de Janeiro, Brazil

Application May 26, 1944, Serial No. 537,500
In Brazil May 7, 1942

11 Claims. (Cl. 219—6)

This invention relates to resistance welding apparatus, and more particularly to an improved resistance welding transformer having a combined single turn rotatable secondary winding and electrode assembly.

Resistance welding transformers as heretofore used for continuous welding have generally included rotatable welding electrodes. In view of the relatively heavy welding currents involved and the difficulties in transmitting such welding currents through movable contacts, the entire transformer including the primary winding, the core and the secondary winding, has been mounted for rotation. Slip rings and brushes have generally been provided on the primary winding for the purpose of transmitting electrical energy thereto.

As a result, the arrangements hitherto used have been relatively heavy and cumbersome, and therefore suitable only for use in fixed locations. Additionally, considerable losses have been present in the transformer circuit due to the necessary use of movable contacts to carry the electrical energy from a source thereof to the primary winding of the transformer. Because of these conditions such rotatable welding transformers have not gone into widespread use.

The present invention provides a lightweight portable welding transformer in which only a combined single turn secondary winding and electrode assembly is made rotatable. All electrical connections to the transformer are through fixed conductors, and energy is transmitted from the primary winding to the rotatable secondary winding by means of induction through the transformer core. A novel combined single turn secondary winding and electrode arrangement inductively receives welding energy from the transformer core and transmits it directly to the work to be welded without the use of any relatively long conductors. As only the secondary winding is made rotatable, the weight of the rotating parts is greatly reduced so that means need not be provided to rotate the electrode assembly, this assembly being rotated merely by contact with the work to be welded being drawn therealong.

It is therefore among the objects of this invention to provide a lightweight, portable welding transformer including a single turn secondary winding rotatably mounted thereon; to provide a resistance welding transformer adapted for continuous welding, in which all electrical connections are made through fixed conductors and no movable conductors are required; to provide a resistance welding transformer which is light in weight, has increased efficiency compared to welding transformers heretofore known, and has an improved power factor; to provide a novel combined single turn secondary winding and welding electrode assembly adapted to be rotatably mounted on the magnetic core of a resistance welding transformer; and to provide a lightweight, efficient, high power electric welding transformer for continuous welding operations.

These and other objects, advantages and novel features of the invention will be apparent from the following description and accompanying drawings. In the drawings:

Fig. 1 is a perspective view of resistance welding apparatus embodying the present invention.

Fig. 2 is a longitudinal sectional view through the apparatus shown in Fig. 1.

Fig. 3 is a front elevation view of a combined insulator and bearing support for the welding electrodes.

Fig. 4 is an end elevation view, partly in section, of the insulating member shown in Fig. 3.

Fig. 5 is a cross-sectional view through the welding electrodes of the apparatus shown in Fig. 1.

Fig. 6 is a perspective view, partly broken away, of a combined single turn secondary winding and electrode assembly forming part of the welding transformer.

Fig. 7 is a central sectional view of the unit shown in Fig. 6.

Fig. 8 is an elevation view partly in section illustrating tube forming rolls which may be used with the present invention.

Fig. 9 is a plan view of the tube forming rolls shown in Fig. 8.

Generally speaking, the present invention comprises a resistance welding transformer including a closed magnetic core, a multi-turn primary winding stationarily mounted on the core and a combined single turn secondary winding and electrode assembly rotatably mounted on the core. The secondary winding includes a pair of rotatable welding electrodes for transmitting welding energy to the work. The multi-turn primary winding is stationarily mounted on one leg of the magnetic core and the single turn secondary winding is rotatably mounted on the opposite leg of the core.

Stationary electrical conductors conduct welding current from a suitable source of alternating current to the primary winding. The welding energy is inductively transmitted from the primary winding through the magnetic core to the rotatable secondary winding, wherein it is concentrated at the welding point. As only the secondary winding rotates, the weight of the rotating parts is greatly reduced as compared to a rotating welding transformer of the usual construction. Furthermore, as energy is transmitted to the secondary winding inductively and the primary winding is stationary, no movable contact arrangements, such as slip rings and brushes, are required. Due to this factor and also to the fact that no conductors are needed between the secondary winding and the welding electrodes, a greater amount of energy can be concentrated at the welding point with the same amount of copper. The welding speed thus can be greatly increased. Additionally, inductive and resistive losses in the welding circuit are greatly reduced, resulting in improved transformer efficiency and an increased power factor. The novel combined single turn secondary winding and electrode arrangement insures geometrical and electrical balance of the welding circuit at all times, preventing current unbalance and enhancing uniformity of the weld.

Referring more specifically to Figs. 1 through 4 of the drawings, the welding apparatus includes a welding transformer 10 having a closed core 15 of magnetic material such as iron or other ferrous metal. A block 16 of insulating material having a central recess 17 matching the contour of core 15 is mounted on one leg 18 of the core. The outer periphery of block 17 is rectangular as indicated at 21, and supports the multi-turn transformer primary winding 20.

In the illustrated embodiment of the invention, primary winding 20 comprises a plurality of stacked U-shaped conductors 22 which are connected together, as by welding or riveting, at adjacent ends such as 23 and 24 to form a continuous multi-turn winding. The ends of the windings are brought out in terminal strips 26 and 27 provided with terminals 28 and 31 which may be connected to a suitable source of alternating welding current. Insulation is disposed between the adjacent conductor turns 22 in a manner well known to those skilled in the art to prevent electrical contact therebetween, and conventional insulated connecting members (not shown) mechanically interconnect the several conductor turns. The illustrated core 15 and primary winding 20 are exemplary only. Other types of transformer cores may be used and a conventionally wound wire primary winding may be substituted for winding 20.

On the opposite leg 33 of core 15 is mounted a combined insulating and bearing member 25 having a central recess 34 shaped to fit leg 33. The outer periphery or bearing surface 36 of member 25 is circular to provide a bearing support for rotation of the welding electrode assembly 50, including welding electrodes 30 and 35 and a conductor 55, and is formed with a central shoulder 32. Member 25 is made of suitable insulating material such as "Formica" or "micarta." As these materials are water lubricated, the cooling arrangement for assembly 50 may be easily combined with member 25. The welding electrode assembly 50 in combination with the work, such as tube 40, comprises a rotatable single turn secondary winding for transformer 10, which inductively receives welding energy from primary winding 20 through core 15 for transmission to the work to be welded.

Referring more particularly to Figs. 1, 5, 6 and 7, electrodes 30 and 35 are split annular members of electrically conductive material, preferably a suitable alloy of welding electrode quality such as "Cupraloy" (an alloy containing copper and silver). Other materials such as brass, aluminum and so forth, may be used. The electrodes are L-shaped in cross-section and have splits or gaps 37 and 38, respectively, in their periphery. Gaps 37 and 38 are aligned. A split annular conductor 55 which is preferably a solid bar of the same material as electrodes 30 and 35 is mounted in the recess formed between axial legs 51 and 52 of the electrodes and shoulder 32 of member 25. Member 55 is formed with a split or gap portion 56 which is disposed diametrically opposite the aligned gaps 37 and 38 of electrodes 30 and 35.

An important feature of the present invention is the novel arrangement for providing a rotatable single turn secondary winding including electrodes 30 and 35, conductor 55 and work 40. The arrangement is such that the secondary or welding circuit is electrically and mechanically balanced at all time so that there will be a uniform flow of welding current through the work to be welded. A series of bolts 57 electrically and mechanically connect one-half 58 of electrode 30 to conductor 55. Bolts 57 extend completely through conductor 55 and also through one-half 60 of electrode 35. However, bolts 57 are insulated from half portion 60 of electrode 35 by insulating bushings 61. Therefore, portion 60 is mechanically connected to conductor 55 and portion 58 of electrode 30, but is electrically insulated from portion 58. A series of bolts 62 connect the other half 63 of electrode 30 to conductor 55. However, insulating bushings 64 electrically insulate this half of electrode 30 from conductor 55. Bolts 62, however, both mechanically and electrically connect the other half 65 of electrode 35 to conductor 55. The bolts 57 and 62 thus mechanically interconnect electrodes 30 and 35 and conductor 55 for rotation as a unit on insulating block 25. However, due to the provision of insulating bushings 61 and 64, only diametrically opposed portions of electrodes 30 and 35 are electrically connected to conductor 55.

The described arrangement is such that any current path through secondary winding 50 must make a complete turn around leg 33 of transformer core 15. For instance, considering Fig. 5, if the current path is considered as starting at edge 66 of tube 40, the path will include, in series, the half portion 58 of electrode 30, conductor 55, the half portion 65 of electrode 35, the half portion 60 thereof, and edge 67 of tube 40. The current must take this complete path around the leg 33 due to the gap 56 in conductor 55, which gap electrically separates portion 58 of electrode 30 and portion 65 of electrode 35, which are electrically connected to conductor 55. Additionally, gaps 37 and 38 of electrodes 30 and 35 prevent the current from flowing directly from one electrode to the other without making a complete circuit around leg 33 of transformer 15.

Insulating material 68 and 69 is provided in the gaps 37 and 38 of electrodes 30 and 35, respectively, to prevent a short circuiting of the transformer secondary winding when the edges of the electrodes adjacent these gaps engage the work to be welded. However, due to the small dimensions of the gaps and the relatively heavy welding currents flowing through the secondary circuit, additional means must be provided to prevent such short circuiting. Accordingly, a cam 70 is mounted on electrode 30 in such a position that when the electrode assembly 50 is rotating in the direction indicated by the arrows in Fig. 1, the cam will strike and operate a plunger 71 of a control switch 72. Control switch 72 is connected through leads 73 to an "Ignitron" control circuit 75. The "Ignitron" control circuit is connected to a source of alternating current through leads 76 and controls the flow of alternating current therefrom through leads 77 to transformer primary winding 20. The "Ignitron" control circuit operates to control the flow of current to the primary winding 20 in a manner well known to those skilled in the resistance welding art. The arrangement is such that opening of switch 72 will effect operation of "Ignitron" control circuit 75 to interrupt or greatly reduce the flow of current to primary winding 20 for the few cycles necessary to permit gap portions 37 and 38 to pass in contact with work 40.

Figs. 8 and 9 illustrate a pair of tube forming rolls 80 and 85 mounted on electrically insulating bearings 81 and 82. These tube forming rolls are illustrative of a series of such rolls through which the work piece 40 passes before it contacts electrodes 30 and 35. Rolls 80 and 85, and their associated rolls, correspond to the roll stands of any desired form of tube rolling mills such as are well known to those skilled in the art. Such tube forming mill shapes a flat strip of metal into the tubular member 40 and urges the edges 66 and 67 thereof into closely adjacent or abutting relation. Accordingly, when the edges beneath electrodes 30 and 35, the heavy welding current passing through the edges weld units the same with a strong, sound, welded joint.

The described resistance welding machine has numerous advantageous features contributing to the economy, speed and quality of welding. The transformer core and the primary winding are stationary, the only rotating element being the electrode assembly, thus greatly reducing the weight of rotating parts. No movable contacts are required as the current in electrodes 30 and 35 is induced therein magnetically from primary winding 20 through core 15, as the electrode assembly with the work constitutes a single complete turn secondary winding for the transformer. In turn, this reduces the electrical impedance of the secondary circuit and thus improves the efficiency and power factor of the whole transformer or welding circuit. As the impedance of the transformer circuit is reduced to a minimum, relatively high frequency alternating current may be employed without excessive losses in the transformer.

Another advantage is that the transformer core may be made multi-phase and a separate electrode assembly constituting a single turn secondary may be mounted on each phase of the transformer core. The elimination of special connections between the transformer and the electrodes greatly decreases the weight of the whole transformer. As the relatively large rotating transformer cores hitherto used are also eliminated, the weight reduction permits the present resistance welding apparatus to be operable without any loss in welding capacity.

The particular electrode arrangement comprising the split annular electrodes electrically connected only at diametrically opposite points to a split annular conductor results in maintaining the welding current in geometrically and electrically stabilized relation at all times, contributing to the uniformity of welding. The plane symmetry of the secondary winding between any two points of the electrodes prevents any current unbalance in the secondary circuit resulting in uniform welds being produced in the work. Furthermore, as moving electrical connections are eliminated, the current input to the transformer may be greatly increased, resulting in greater welding speed. As the weight of the rotating parts is reduced to a minimum, the electrodes may be rotated simply by contact with the work to be welded, thus eliminating mechanical connections to rotating parts of the apparatus.

As an example of the above advantages, whereas in welding machines of standard make six to eight volts are required at open circuit in order to produce 1.8 volts at the work to be welded, in the resistance welding apparatus of the invention, the open circuit voltage is of substantially the same order as the welding voltage. The increase in operating efficiency and decrease in losses is thus readily apparent. Furthermore, for the same welding capacity, apparatus constructed according to the present invention is about one-fifth the weight and volume of prior art apparatus.

While a specific embodiment of the invention has been described in detail to illustrate the application of the principles thereof, it will be understood that the invention may be otherwise embodied without departing from such principles.

What is claimed is:

1. In welding apparatus, a transformer comprising a core, a multi-turn primary winding fixedly mounted on said core, and a single turn secondary winding comprising a pair of circumferentially split annular welding electrodes rotatably mounted on said core in spaced relation to each other, the splits in said electrodes being aligned, a circumferentially split annular conductor mounted between and mechanically secured to each electrode and diametrically oppositely spaced means each respectively electrically connecting one electrode to said conductor to provide at least one complete secondary winding turn about said core; said secondary winding being completed by the work to be welded.

2. In welding apparatus, a transformer comprising a core, a multi-turn primary winding fixedly mounted on said core, and a single turn secondary winding comprising a pair of circumferentially split annular welding electrodes rotatably mounted on said core in spaced relation to each other, the splits in said electrodes being aligned, a circumferentially split annular conductor mounted between and mechanically secured to each electrode, the split in said conductor being diametrically opposite the splits in said electrodes, and diametrically oppositely spaced means each respectively electrically connecting one electrode to said conductor to provide at least one complete secondary winding turn about said core; said secondary winding being completed by the work to be welded.

3. In welding apparatus, a transformer comprising a core, a multi-turn primary winding fixedly mounted on said core and insulated therefrom, and a single turn secondary winding comprising a pair of circumferentially split annular welding electrodes rotatably mounted on said core in spaced relation to each other and insulated from said core, the splits in said electrodes being aligned, a circumferentially split annular conductor mounted between and mechanically secured to each electrode, the split in said conductor being diametrically opposite the splits in said electrodes, diametrically oppositely spaced means each respectively electrically connecting one electrode to said conductor to provide at least one complete secondary winding turn about said core, said secondary winding being completed by the work to be welded; and means associated with said electrodes for preventing a short circuit of said secondary winding when the split portions of said electrodes are aligned with the work to be welded during rotation of said electrodes in contact with the work.

4. In welding apparatus, a transformer comprising a core, a multi-turn primary winding fixedly mounted on said core and insulated therefrom, and a single turn secondary winding comprising a pair of circumferentially split annular welding electrodes rotatably mounted on said core in spaced relation to each other and insulated from said core, the splits in said electrodes being aligned, a circumferentially split annular conductor mounted between and mechanically secured to each electrode, the split in said conductor being diametrically opposite the splits in said electrodes, diametrically oppositely spaced means each respectively electrically connecting one electrode to said conductor; said secondary winding being completed by the work to be welded; and switch means associated with said electrodes to momentarily interrupt the welding current for preventing a short circuit of said secondary winding when the split portions of said electrodes are aligned with the work to be welded during rotation of said electrodes in contact with the work.

5. In welding apparatus, a transformer comprising a closed magnetic core, a multi-turn primary winding fixedly mounted on one leg of said core and insulated therefrom, a circular member of insulating material fixedly mounted on the opposite leg of said core, and a single turn secondary winding comprising a pair of circumferentially split annular welding electrodes rotatably mounted on said circular insulating member in spaced relation to each other, the splits in said electrodes being aligned, a circumferentially split annular conductor mounted between and mechanically secured to each electrode, and diametrically oppositely spaced means each respectively electrically connecting one electrode to said conductor to provide at least one complete secondary winding turn about said core; said secondary winding being completed by the work to be welded.

6. In welding apparatus, a transformer comprising a closed magnetic core, a multi-turn primary winding fixedly mounted on one leg of said core and insulated therefrom, a circular member of insulating material fixedly mounted on the opposite leg of said core, and a single turn secondary winding comprising a pair of circumferentially split annular welding electrodes rotatably mounted on said circular insulating member in spaced relation to each other, the splits in said electrodes being aligned, a circumferentially split annular conductor mounted between and mechanically secured to each electrode, the split in said conductor being diametrically opposite the splits in said electrodes; and diametrically oppositely spaced means each respectively electrically connecting one electrode to said conductor to provide at least one complete secondary winding turn about said core; said secondary winding being completed by the work to be welded.

7. In welding apparatus, a transformer comprising a closed magnetic core, a multi-turn primary winding fixedly mounted on one leg of said core and insulated therefrom, a circular member of insulating material fixedly mounted on the opposite leg of said core, and a single turn secondary winding comprising a pair of circumferentially split annular welding electrodes rotatably mounted on said circular insulating member in spaced relation to each other, the splits in said electrodes being aligned, a circumferentially split annular conductor mounted between and mechanically secured to each electrode, the split in said conductor being diametrically opposite the splits in said electrodes; diametrically oppositely spaced means each respectively electrically connecting one electrode to said conductor; said secondary winding being completed by the work to be welded; and switch means associated with said electrodes to momentarily interrupt the welding current for preventing a short circuit of said secondary winding when the split portions of said electrodes are aligned with the work to be welded during rotation of said electrodes in contact with the work.

8. In a welding transformer, a single turn secondary winding comprising a pair of circumferentially split annular welding electrodes adapted to be rotatably mounted on the core of said transformer in spaced relation to each other and insulated therefrom, the splits in said electrodes being aligned, a circumferentially split annular conductor mounted between and mechanically secured to each electrode, the split in said conductor being diametrically opposite the splits in said electrodes, and diametrically oppositely spaced means each respectively electrically connecting one electrode to said conductor to provide at least one complete secondary winding turn about said core; said secondary winding being completed by the work to be welded.

9. In a welding transformer, a single turn secondary winding comprising a pair of circumferentially split annular welding electrodes adapted to be rotatably mounted on the core of said transformer in spaced relation to each other and insulated therefrom, the splits in said electrodes being aligned, a circumferentially split annular conductor mounted between and mechanically secured to each electrode, the split in said conductor being diametrically opposite the splits in said electrodes, diametrically oppositely spaced means each respectively electrically connecting one electrode to said conductor to provide at least one complete secondary winding turn about said core; said secondary winding being completed by the work to be welded; and means associated with said electrodes for preventing a short circuit of said secondary winding when the split portions of said electrodes are aligned with the work to be welded during rotation of said electrodes in contact with the work.

10. In a welding transformer, a single turn secondary winding comprising a circular member of insulating material adapted to be fixedly mounted on the core of said transformer, a pair of circumferentially split annular welding electrodes rotatably mounted on said circular insulating member in spaced relation to each other, the splits in said electrodes being aligned, means mechanically interconnecting said electrodes for rotation as a unit and means electrically connecting one half of each electrode to a diametrically opposite spaced half of the other electrode to provide at least one complete secondary winding turn about said core and including the work to be welded.

11. In a welding transformer, a single turn secondary winding comprising a circular member of insulating material adapted to be fixedly mounted on the core of said transformer, a pair of circumferentially split annular welding electrodes rotatably mounted on said circular insulating member in spaced relation to each other, the splits in said electrodes being aligned, a circumferentially split annular conductor mounted between and mechanically secured to each electrode, the split in said conductor being diametrically opposite the splits in said electrodes and diametrically oppositely spaced means each respectively electrically connecting one electrode to said conductor to provide at least one complete secondary winding turn about said core; said secondary winding being completed by the work to be welded.

PAUL CAHEN.
GUSTAVO ADOLPHO MARINHO LUTZ.

REFERENCES CITED

The following references are of record in the file of this patent:

UNITED STATES PATENTS

| Number | Name | Date |
|---|---|---|
| 1,199,537 | Fulda | Sept. 26, 1916 |
| 2,283,940 | Morris | May 26, 1942 |